March 31, 1936.    A. HOFMANN    2,035,810
MILLING ATTACHMENT
Original Filed June 20, 1934    7 Sheets-Sheet 1
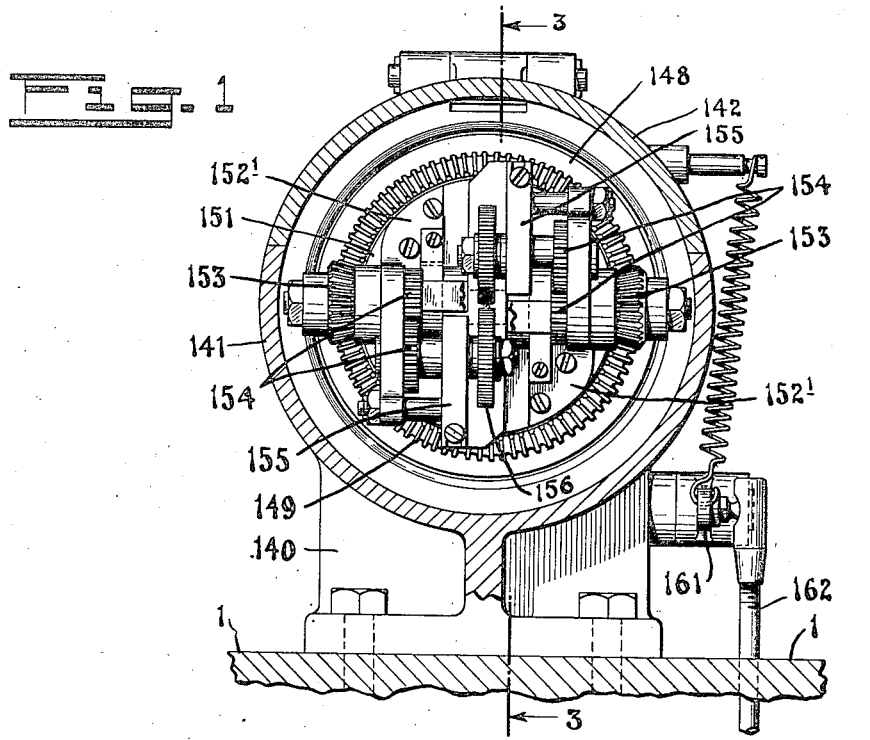
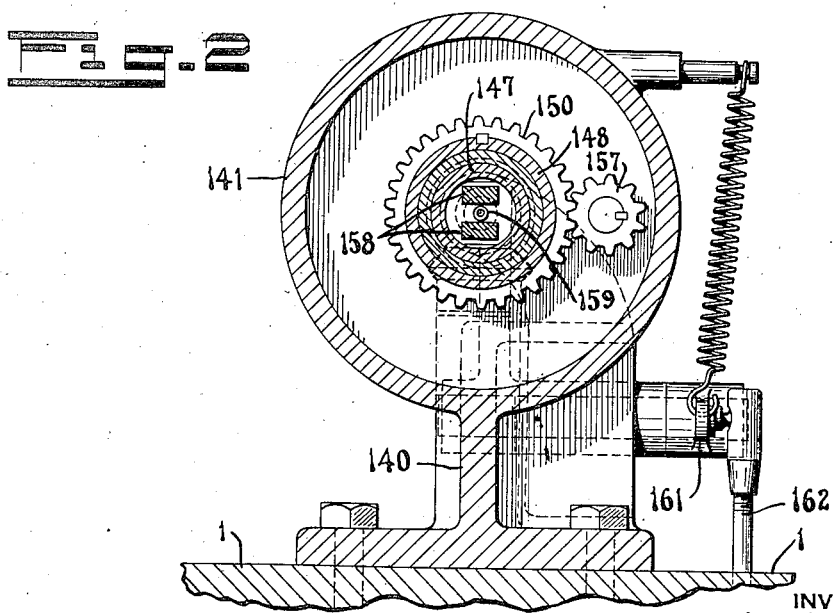
INVENTOR
Alfred Hofmann
BY Darby & Darby
ATTORNEYS

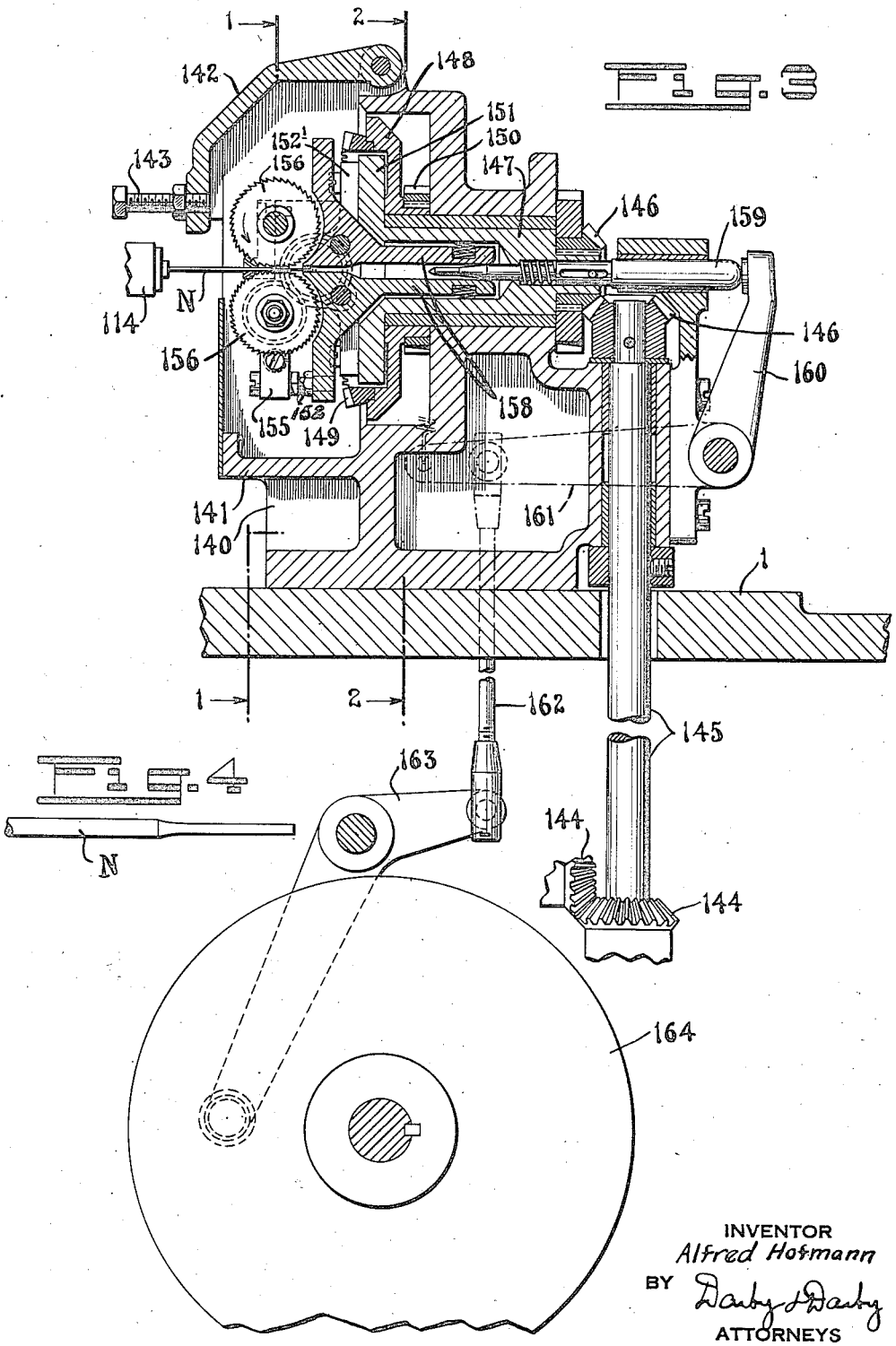

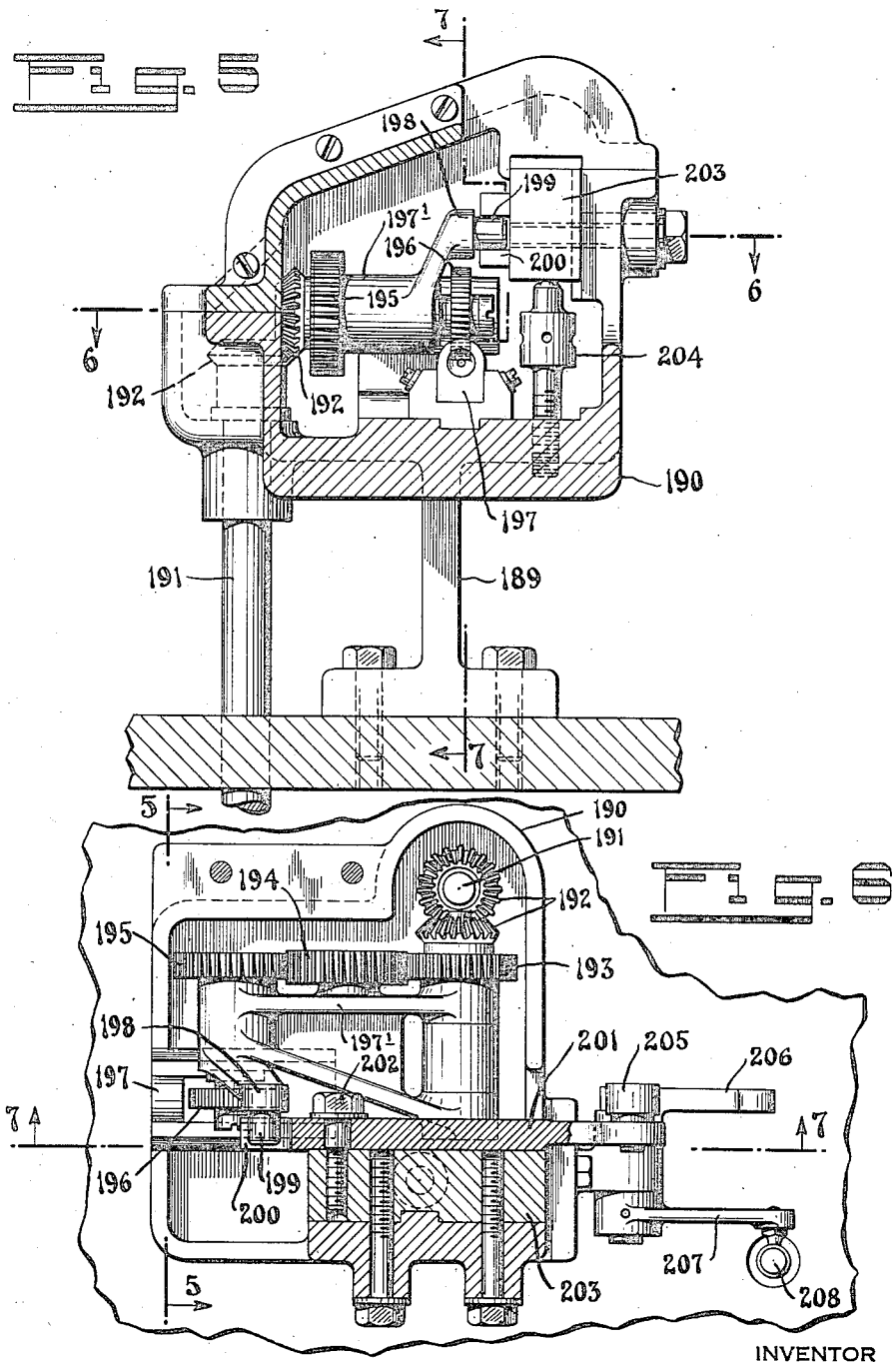

March 31, 1936.  A. HOFMANN  2,035,810
MILLING ATTACHMENT
Original Filed June 20, 1934  7 Sheets-Sheet 4
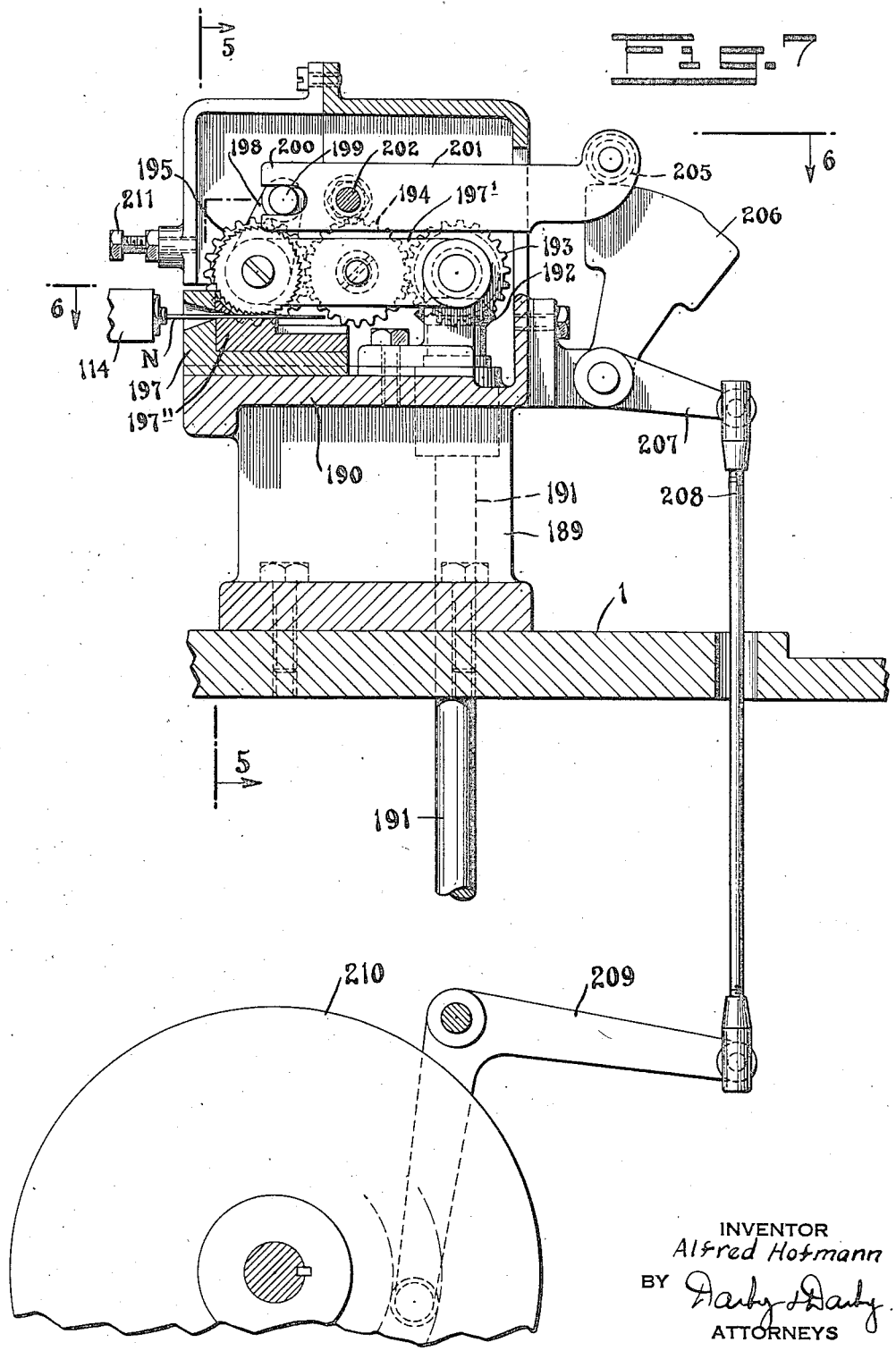
INVENTOR
Alfred Hofmann
BY Darby & Darby
ATTORNEYS March 31, 1936.  A. HOFMANN  2,035,810
MILLING ATTACHMENT
Original Filed June 20, 1934  7 Sheets-Sheet 5
FIG. 8
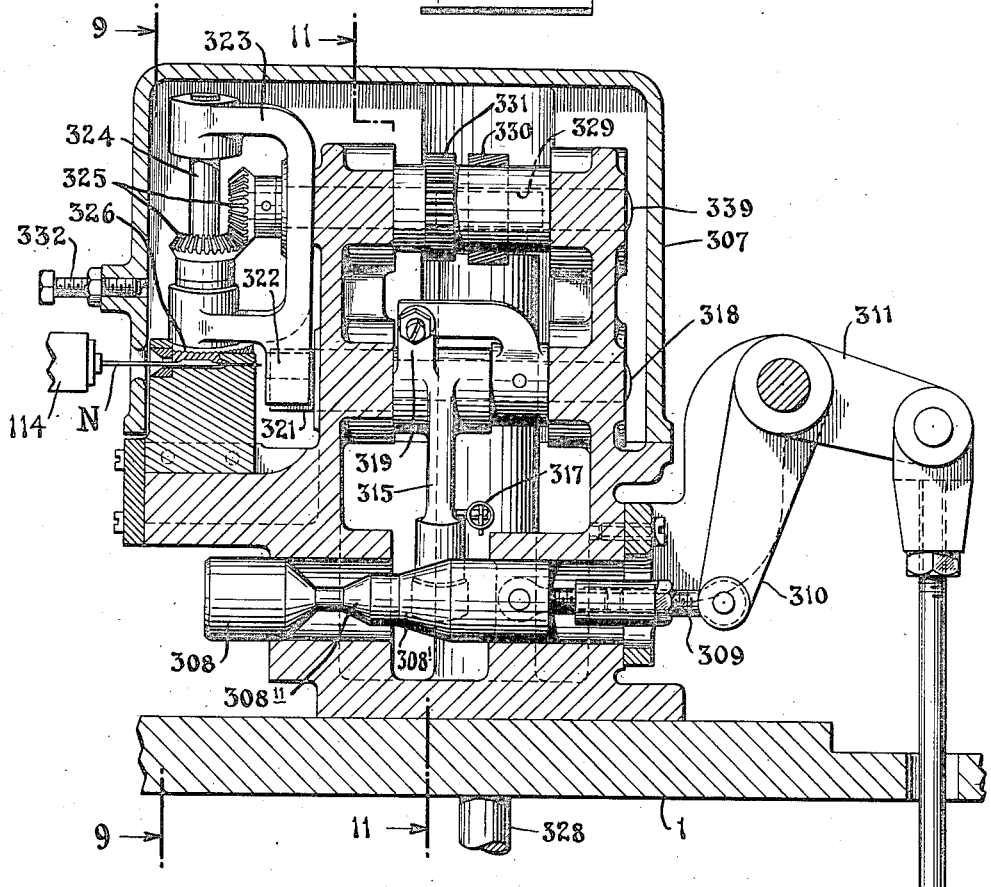
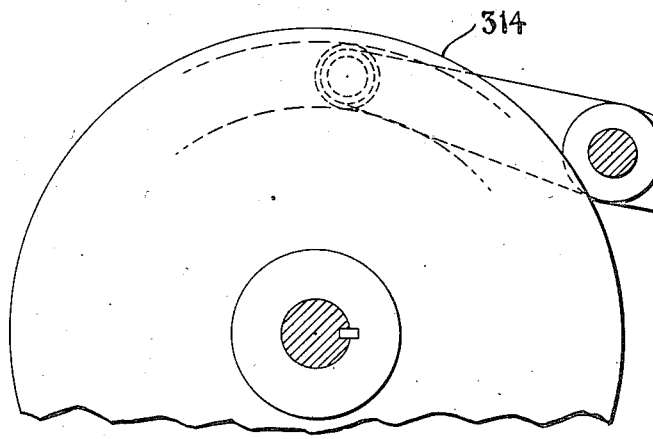
INVENTOR
Alfred Hofmann
BY
Darby & Darby
ATTORNEYS

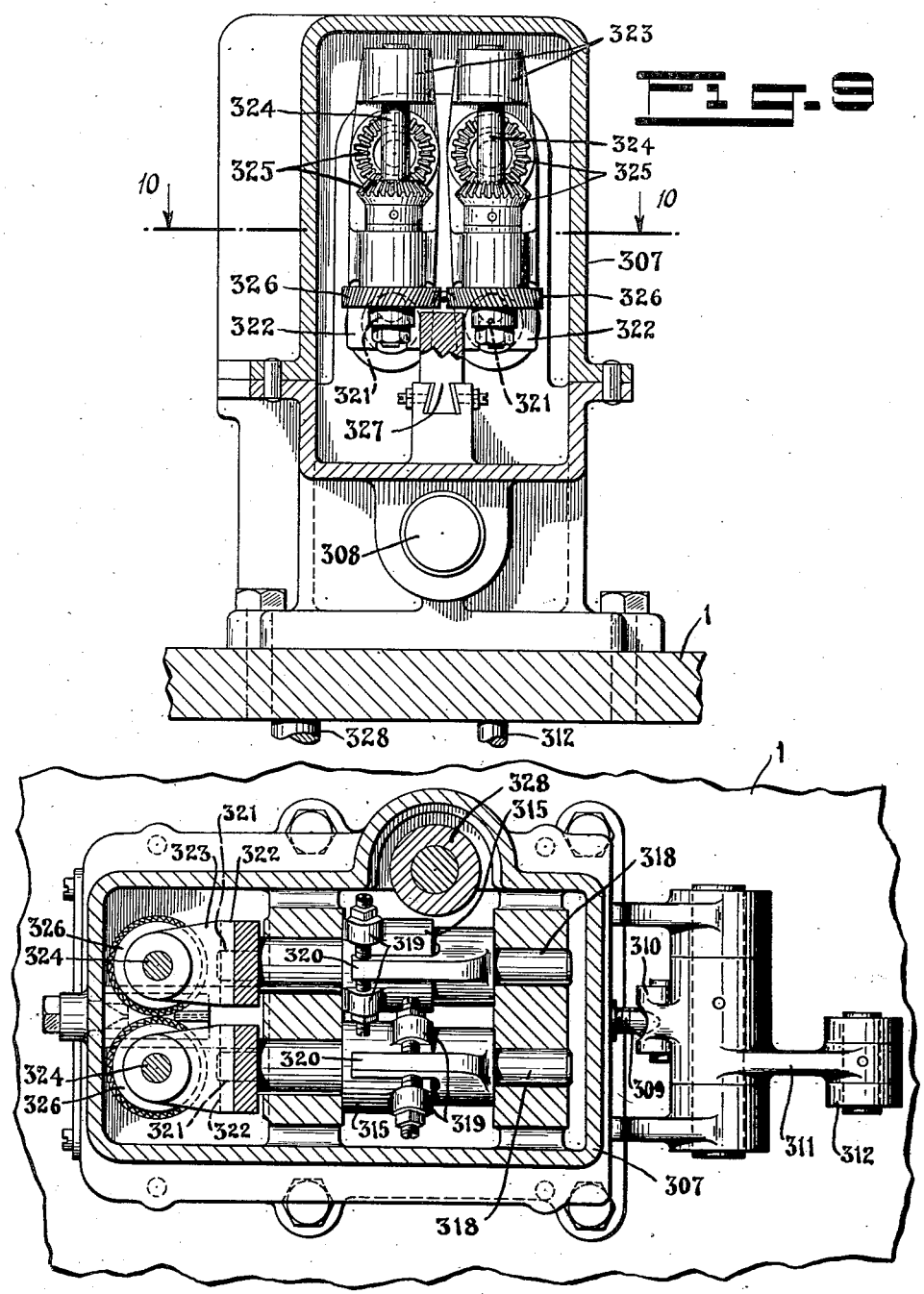

March 31, 1936.

A. HOFMANN 2,035,810

MILLING ATTACHMENT

Original Filed June 20, 1934    7 Sheets-Sheet 7

INVENTOR
Alfred Hofmann
BY
Darby & Darby
ATTORNEYS

Patented Mar. 31, 1936

2,035,810

UNITED STATES PATENT OFFICE 2,035,810

MILLING ATTACHMENT

Alfred Hofmann, Palisade, N. J., assignor to Alfred Hofmann Needle Works, Inc., Union City, N. J., a corporation of New Jersey Original application June 20, 1934, Serial No. 731,440. Divided and this application June 22, 1935, Serial No. 27,839

6 Claims. (Cl. 90—15)

This invention is for improvements in milling machines of a type more particularly adapted to combination with other attachments to provide automatic metal working machines.

An object of this invention is to provide a milling head in several forms in which work pieces of varying diameters or contour may be milled.

Another object of this invention is to provide in a milling head movable supporting mechanism for the milling cutters and means for effecting movement thereof to cause the milling cutters to follow the contour of a work piece.

A further object of this invention is to provide in such an arrangement driving mechanism for effecting rotation of the milling cutters on their axes as they are moved to follow the contour of a work piece.

The inventions herein disclosed have many specific objects, the nature of which and the manner of attainment will be apparent from the following detailed description when taken in connection with the attached drawings.

This invention resides substantially in the combination, construction, arrangement, relative location of parts, steps and series of steps, all as will be set forth in full detail in the following specification in connection with the attached drawings, and pointed out in the appended claims.

This application is a division of my copending application Serial No. 731,440, filed June 20, 1934 for "Method and machine for making knitting needles."

In the drawings,

Figure 1 is a cross sectional view taken on the line 1—1 of Figure 3 of one form of milling head in accordance with this invention;

Figure 2 is a cross sectional view taken on the line 2—2 of Figure 3;

Figure 3 is a cross sectional view taken on the line 3—3 of Figure 1;

Figure 4 is an elevational view of the beard end of a knitting needle representing one form of work piece which may be operated upon by means of the milling attachments of this disclosure;

Figure 5 is a cross sectional view taken on the line 5—5 of Figure 7, showing a modified form of milling head in accordance with this invention;

Figure 6 is a cross sectional view taken on the line 6—6 of Figure 7;

Figure 7 is a cross sectional view taken on the line 7—7 of Figure 5;

Figure 8 is a vertical, central, longitudinal, cross sectional view through another form of milling attachment in accordance with this invention;

Figure 9 is a cross sectional view taken on the line 9—9 of Figure 8;

Figure 10 is a cross sectional view taken on the line 10—10 of Figure 9;

Figure 11:
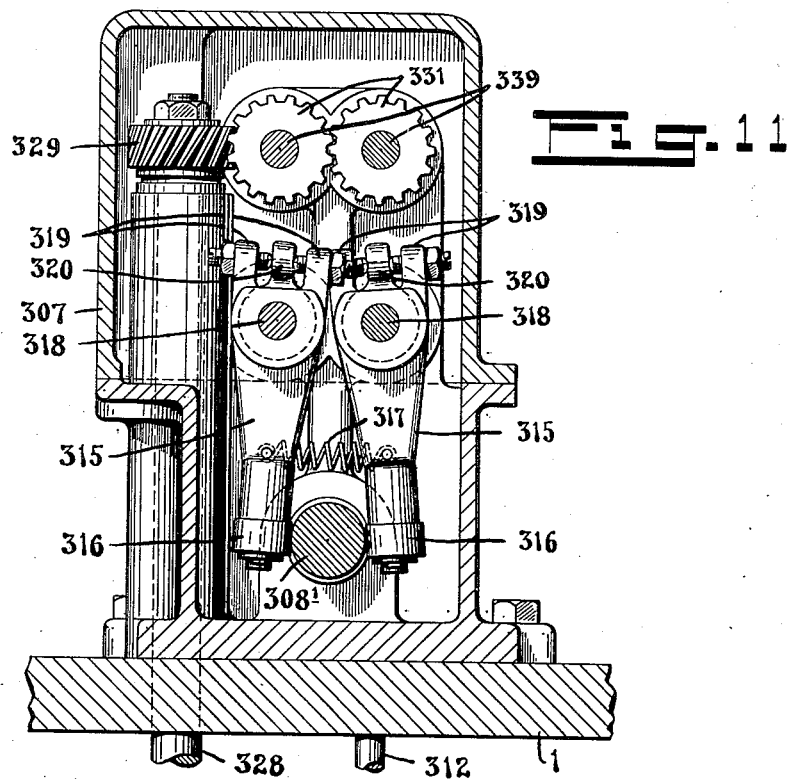
Figure 11 is a cross sectional view taken on the line 11—11 of Figure 8.
Figure 12:
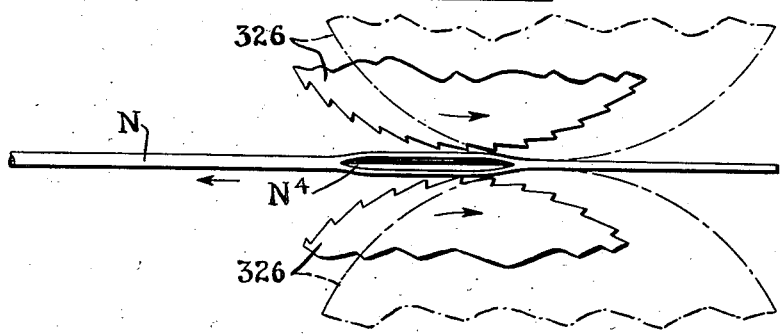
Figure 12 is an elevational view illustrating the action of this milling attachment upon the sides of a knitting needle at the slot.

The milling heads or attachments comprising the invention herein disclosed form part of a larger combination comprising an automatic machine for manufacturing spring beard knitting needles from wire stock. For this reason the operation of the milling heads herein disclosed will be described in connection with spring beard needles as indicated in Figures 4 and 12, although it is of course apparent that these mechanisms may be employed for operation upon many other forms of work pieces. It will likewise be apparent that the structures herein disclosed may be used independently of other mechanism, and of each other, or may be used as parts of a larger combination such as that represented in the parent application above referred to.

The milling attachment which reduces the diameter at the end of the needle in preparation for swedging is illustrated in Figures 1 to 3 inclusive, and the form of the needle after the milling operation is shown in Figure 4. This attachment comprises a support 140 mounted on the table 1, and formed into a housing 141 having a pivotally mounted cover 142 upon which is mounted an adjustable stop. A pair of beveled gears 144, driven from the power source, operate the shaft 145, and the upper meshing beveled gears 146. One of these beveled gears is keyed to an enlarged shaft 147 journaled in the housing 141.

Mounted around the large sleeve for the shaft 147 is a circular plate 148 which has keyed thereto a gear 150 which locks with a fixed gear 157 (see Figure 2) mounted on the housing 141. These gears and plate are locked in the housing through the flange 151 of shaft 147. The plate 148 supports a fixed bevel gear 149. Mounted on the enlarged end 151 of shaft 147 are the brackets 152' in which are journaled the bevel gears 153, which mesh with the bevel gear 149. These bevel gears drive the pairs of gears 154, one of each of which is secured to the same shaft to which one of the bevel gears 153 is attached, and the other of which is secured to a shaft upon which the milling cutters 156 are mounted. The milling cutter shafts are journaled in the pivotally held brackets 155. Thus the milling cutters 156 are caused to revolve on their axes through the gear trains which in turn are driven by reason of the fact that the supporting mechanism therefor revolves with shaft 147. Thus the milling cutters as they cut rotate around the periphery of the wire, maintaining a circular cross section while reducing its diameter.

Pivotally mounted on brackets 155, as shown in Figure 2, are a pair of bell crank levers which have the arms 158 projecting into a recess in the shaft 147 and provided with springs for urging them towards each other. The other arm of these bell crank levers carries a set screw 152 to adjust the bell crank levers into proper relationship with the pivotally mounted brackets 155.

The purpose of journaling the milling cutters in the pivotally mounted brackets 155 in connection with the pivotally supported bell crank levers is so that they may be opened at the time the end of the wire is inserted between them, and may be closed for the milling operation when the wire is slowly removed from between them. The movement of the milling cutters from and towards the end of the wire is effected by means of the slidably mounted shaft 159, which has an inner conical end which passes between the arms 158 of the bell crank levers. Rod 159 is shown in Figure 3 at the left hand position, at which time it has forced the arms 158 apart against the action of the springs resting between them and the inner wall of the recess in shaft 147, thereby moving the milling cutters together. The action of moving the milling cutters towards each other does not occur instantaneously but is a progressive action determined by the slope of the conical end of the rod 159. In other words, as the milling action goes on, these cutters gradually move together until the end of the wire is reduced to the desired minimum diameter. The sliding movement of rod 159 is effected through the pivotally mounted lever 160, which is operated by lever 161 through the link connection 162 and the bell crank lever 163, which in turn is given the proper movement by the cam 164. Thus, at the beginning of the operation the milling cutters 156 are wide open and the chuck assembly or work holder 114 projects the end of the wire between them. Cam 164 then begins to slowly move rod 159 to the left (Figure 3), gradually moving the milling cutters towards each other, until the rod 159 has moved in the full distance. In the meantime, of course, the cutters are rotated about the surface of the wire, giving it a circular cross section, while the chuck 114 slowly withdraws the wire.

The end of the wire is supported as shown in Figure 3 in a guide mounted on 152'. The chuck assembly 114 is then gradually withdrawn with the result that the wire is milled down at the end of its predetermined diameter. After the wire is fully withdrawn the main turret moves on and cam 164 continues its operation to withdraw arm 160, permitting the spring around the rod 159 to follow it as it moves to the right.

As indicated for example in Figure 3 the work piece may be presented to the milling head by a chuck or other suitable work holder which may or may not comprise part of an automatic feeding and holding mechanism. It is also positioned to manually present the work pieces to the milling head. It may be emphasized that the end of the work piece is reduced to a desired uniform diameter of accurate circular cross section by reason of the fact that the milling cutters revolve about the axis of the work piece as they rotate on their own axes and as the work piece is slowly withdrawn from between them. At the same time the milling cutters may be caused to move either towards or away from the work piece thereby modifying its contour, in accordance with the shifting of the cam end of the rod 159, as will be apparent to those skilled in the art.

A milling head of somewhat similar construction has been illustrated in Figures 5, 6 and 7, and will now be described in detail. This attachment comprises a fixed base 189 secured to the table 1 and provided with a housing 190. At 191 is a shaft driven from below the table from the power source, which in turn drives through the meshing bevel gears 192, the gear train 193, 194, and 195. Gear 193 is mounted on a fixed axis while the idler gear 194 and the gear 195 are rotatably mounted on the arm 197' which is pivotally mounted on the axis of gear 193. Gear 195 is attached to a short shaft to which the milling cutter 196 is secured. This milling cutter is positioned over an anvil 197" (Figure 7), which is mounted in back of the guide piece 197, which has a conical opening for guiding the needle on to the anvil.

Here again, as illustrated in Figure 7, the work piece N is held in a chuck 114, which is operated to slowly withdraw the work piece from the attachment so that the milling cutter operates on the top surface of a portion thereof next adjacent to the reduced end as produced by the previously described structure. The purpose of the adjustable stop screw 211 is of no importance here, although it may be noted that it determines the distance which the chuck 114 inserts the work piece into the milling attachment when an automatically operated work holder is employed.

The lever 197' pivotally movable, supports the cutter so that the cutter is raised during the insertion of the needle and is then moved down so as to engage the top of the needle and to be gradually fed thereinto to get the proper depth of cut. As soon as the milling cutter has been moved into the work the proper distance as determined by cam 206 the work piece is then slowly withdrawn causing a continuation of the cut for any desired distance. It is of course apparent that the camming edge of the cam 206 may be modified as desired to continuously or intermittently vary the depth of the cut taken by the cutter. The movement of the milling cutter into contact with the needle is accomplished by means of a cam operated lever. The end of lever 197' is provided with an arm 198 which terminates in a pin 199 riding in the forked end 200 of the lever 201. This lever is pivotally supported on a screw 202 which is mounted in a block 203 vertically adjustable by means of the screw 204 (Figure 5), so as to determine the range of movement of the milling cutter. Lever 201 is provided on its outer end with a roller 205 which engages an oscillatable cam 206 which is pivotally mounted on the housing and secured to a shaft to which the lever 207 is secured. Lever 207 is connected by a rod 208 to a pivotally supported bell crank lever 209 oscillated by a cam 210 driven from the power source below the table. Thus after the needle is fully in and resting on the anvil 197" the cutter is fed into it as cam 206 moves upwardly, causing the forked end 200 of lever 201 to move downwardly (Figure 7). This movement of lever 201 causes lever 197' to move downwardly to the proper depth. The needle is then slowly withdrawn, milling a complete flat on the top thereof.

Here again the work piece may be manually presented to the milling head if desired.

The third form of milling head is illustrated in Figures 8 to 12 inclusive. In this attachment continuing the description in connection with a knitting needle N, the sides of the slot N4 are milled to the proper dimensions.

This attachment mills the sides of the slot as indicated in Figure 12, as the needle is withdrawn from between the milling cutters 326 against direction of rotation.

The needle is inserted between the milling cutters when they are separated and when positioned the milling cutters move together to the full line position up to the extreme left hand end of the sides of the slot so that the straight portions of the side may be milled as the needle is withdrawn. When the needle is withdrawn to the point where the straight sides converge in to the needle point the milling cutters are given a further movement towards each other in the proper timed relation to the movement of the needle, so as to mill the converging sides of the slot. At the end of the operation the milling cutters have been moved to the position indicated by the dotted line circles in Figure 12.

This attachment (Figures 8, 9, 10, and 11) comprises a housing 307 secured to the table 1, so that the chuck 114 may present a needle thereto. Slidably mounted in the base of the housing is the operating member 308 for giving the milling cutters the proper movement towards and away from the needle. This member comprises a plurality of cylindrical sections connected by the conical portions 308' and 308''. The member 308 is given sliding movement by means of the link 309 pivotally connected to the lever 310 which is secured to the same shaft to which the lever 311 is secured. Lever 311 is pivotally connected by means of the link rod 312 to a pivotally supported lever 313 which is oscillated by the cam 314 supported below the table and operated from the power source in the proper timed relation, as will be clear to those skilled in the art.

Pivotally supported upon the shafts 318 and not connected thereto, are a pair of levers 315 provided at their lower ends with rollers 316 positioned so that the inclined portions 308' and 308'' of the member 308 may bear thereagainst. The levers 315 are urged towards each other and into contact with the member 308 by means of the spring 317. The collars upon which the levers 315 are mounted are each provided with a pair of ears 319 having adjustable screws mounted therein and engaging the opposite sides of a lever 320 secured to, for rotation with, the shaft 318. The inner ends of the shafts 318 are provided with small eccentric pins 321 which operate between the forked lower ends 322 of the U-shaped oscillatable arbors 323.

The arbors 323 are pivotally mounted upon the shafts 339 and in turn rotatably support the cutter shafts 324. These shafts are driven from the shafts 339 by means of the pairs of beveled gears 325. The lower ends of the shafts 324 have secured thereto the milling cutters 326 which, as clearly shown in Figure 9, are positioned above the needle anvil 327 on opposite sides of the needle when inserted. The anvil 327 is adjustably mounted upon a support shown in Fig. 9, so as to properly support the needle. A shaft 328, driven in any suitable manner from the power source below the table is provided at its upper end with a spiral driving gear 329 which meshes with a driven spiral gear 330 mounted upon one of the shafts 339 for effecting rotation thereof. This same shaft is provided with a gear 331 which meshes with a similar gear 331 on the other shaft 339. Thus the milling cutters will be caused to revolve from the driven shaft 328. Here again the adjustable stop screw 332 is provided to control the distance which the chuck 114 moves the needle N in to the attachment. The stop screw of course forms no part of this invention where the automatically operating chuck is not disclosed.

In the operation of this device, when the member 308 is positioned as shown in Figure 8, the lower ends of the levers 315 are separated a maximum distance, at which time the milling cutters are closed. When member 308 is at the right, arms 315 are closest together and the cutters are separated. The needle is then fed on to the anvil and between the separated cutters. Cam 314 is so shaped that in its first movements the member 308 is moved to the left (Figure 8), so that the inclined portion 308' gradually passes between the rollers on the lower ends of arms 315, permitting them to be gradually separated. The result is that the cutters are moved towards each other and into contact with the straight sides of the slot portion of the needle. The needle is being slowly withdrawn at the same time that the member 308 is continuing to move to the left, and traversing the cylindrical portion thereof intermediate the two inclined portions. At the time the saws reach the end of the straight sides of the slot the inclined portion 308' of member 308 has begun to pass between the rollers on the arms 315. The result is that they begin to slowly move together, gradually bringing the cutters closer together and permitting them to follow the converging edges of the slot down to the dotted position shown in Figure 12. Thus, with the parts properly timed the slot may be properly milled as described. At the end of the milling operation cam 314 causes a quick return of the member 308, swinging the cutters apart, and holding them there until a new needle is inserted between them.

Here again it will be apparent that the attachment may be adapted to follow and mill any desired contour by modifying the shapes of the camming surfaces on the cam 308.

In view of the above description it will be apparent that this invention involves certain principles of construction and arrangement of parts which may be modified by those familiar with the art without material departure from the scope of the real invention involved. I do not, therefore, desire to be strictly limited to the disclosure as given for purposes of illustration, but rather to the scope of the appended claims.

What I seek to secure by United States Letters Patent is:

1. A milling device as described comprising a housing, a pair of milling cutter supports pivotally mounted in the housing, milling cutters journaled on said supports, means for causing said milling cutters to rotate on their axes, and cam means cooperating with said milling supports for causing the milling cutters to move towards and away from each other in accordance with the cam contour.

2. A milling device as described comprising a housing, a carrier rotatably supported in the housing, means for causing rotation of said carrier about a fixed axis, a pair of rollers pivotally mounted on said carrier, a pair of milling cutters rotatably supported on said rollers, means for causing rotation of said milling cutters as said carrier revolves, and power operated means co-acting with said rollers to cause the milling cutters to move with respect to each other as they revolve about the fixed axis of the carrier and rotate upon their own axes.

3. In a milling attachment of the type described the combination including a carrier journaled for rotation on its axis, a pair of supports pivotally mounted on the carrier, a pair of milling cutters rotatably mounted on the supports, means for rotating the milling cutters actuated by rotation of the carrier, and means cooperating with said pair of supports for moving the cutters towards and away from each other while the carrier is revolving.

4. A milling attachment of the type described comprising a housing, a carrier rotatably mounted in the housing, a pair of milling cutters rotatably mounted on the carrier, a gear fixedly supported adjacent the carrier, and gears connected to said milling cutters and meshing with said first mentioned gear for effecting rotation of the cutters on their axes as the carrier revolves.

5. A milling attachment of the type described comprising a housing, a carrier rotatably mounted in the housing, a pair of arms pivotally mounted on the carrier, a pair of milling cutters rotatably journaled on said arms, a ring gear fixed adjacent said carrier, gears meshing with said ring gear and connected to said cutters for rotating them as the carrier revolves, and means for moving said arms towards and away from each other while the carrier revolves.

6. A milling attachment of the type described comprising a support, a pair of arbors pivotally mounted on the support, milling cutters journaled on said arbors, means for effecting rotation of said milling cutters, and means for moving said arbors towards and away from each other including a pair of shafts connected to the arbors, a lever on each of said shafts, resilient means for urging said levers towards each other, and a reciprocal cam movable between said levers to effect oscillation thereof.

ALFRED HOFMANN.